United States Patent [19]

Brym

[11] Patent Number: 4,620,476

[45] Date of Patent: Nov. 4, 1986

[54] MULTI-PURPOSE KITCHEN APPLIANCE

[75] Inventor: Stanley J. Brym, Torrington, Conn.

[73] Assignee: Dynamics Corporation of America, Greenwich, Conn.

[21] Appl. No.: 760,092

[22] Filed: Jul. 29, 1985

[51] Int. Cl.⁴ .................... B01F 7/00; B01F 15/00; A47J 43/00; A47J 44/00

[52] U.S. Cl. .................... 99/484; 30/401; 99/646 R; 248/201; 248/317; 312/245; 312/248; 366/205; 366/349

[58] Field of Search ............. 99/340, 484, 485, 646 R; 366/129, 130, 197–199, 205, 206, 314, 349; 30/400–405; 312/245, 247, 248; 248/201, 317

[56] References Cited

U.S. PATENT DOCUMENTS

| | | | |
|---|---|---|---|
| 2,003,259 | 5/1935 | Gilbert et al. | 99/484 |
| 2,007,300 | 7/1935 | Gilbert et al. | 99/484 X |
| 2,943,846 | 7/1960 | Lambert | 366/199 |
| 3,002,652 | 10/1961 | Smith et al. | |
| 3,224,743 | 12/1965 | Freedman et al. | |
| 3,232,212 | 2/1966 | Karlen et al. | |
| 3,758,183 | 9/1973 | Steinkamp et al. | 312/245 X |
| 3,846,005 | 11/1974 | Harper et al. | 312/248 |
| 3,942,669 | 3/1976 | Savage, Jr. | 312/245 X |
| 3,951,351 | 4/1976 | Ernster et al. | |
| 4,071,789 | 1/1978 | Ernster et al. | |
| 4,313,043 | 1/1982 | White et al. | 312/245 X |
| 4,334,724 | 6/1982 | Rogers, Sr. | |
| 4,422,343 | 12/1983 | Falkenbach et al. | |

Primary Examiner—Timothy F. Simone
Attorney, Agent, or Firm—Sixbey, Friedman & Leedom

[57] ABSTRACT

The combined multi-purpose kitchen appliance includes a bracket unit for attachment beneath a kitchen cabinet and an appliance assembly which is pivotally mounted within the bracket unit to permit movement of electric kitchen appliances mounted on opposite sides of the appliance assembly into use positions. The appliance assembly is a unitary assembly which may be inserted or removed from the bracket unit without the use of additional mounting components, and the appliance assembly is designed to enhance the rigidity of the bracket unit when the appliance assembly is in a use position.

23 Claims, 14 Drawing Figures

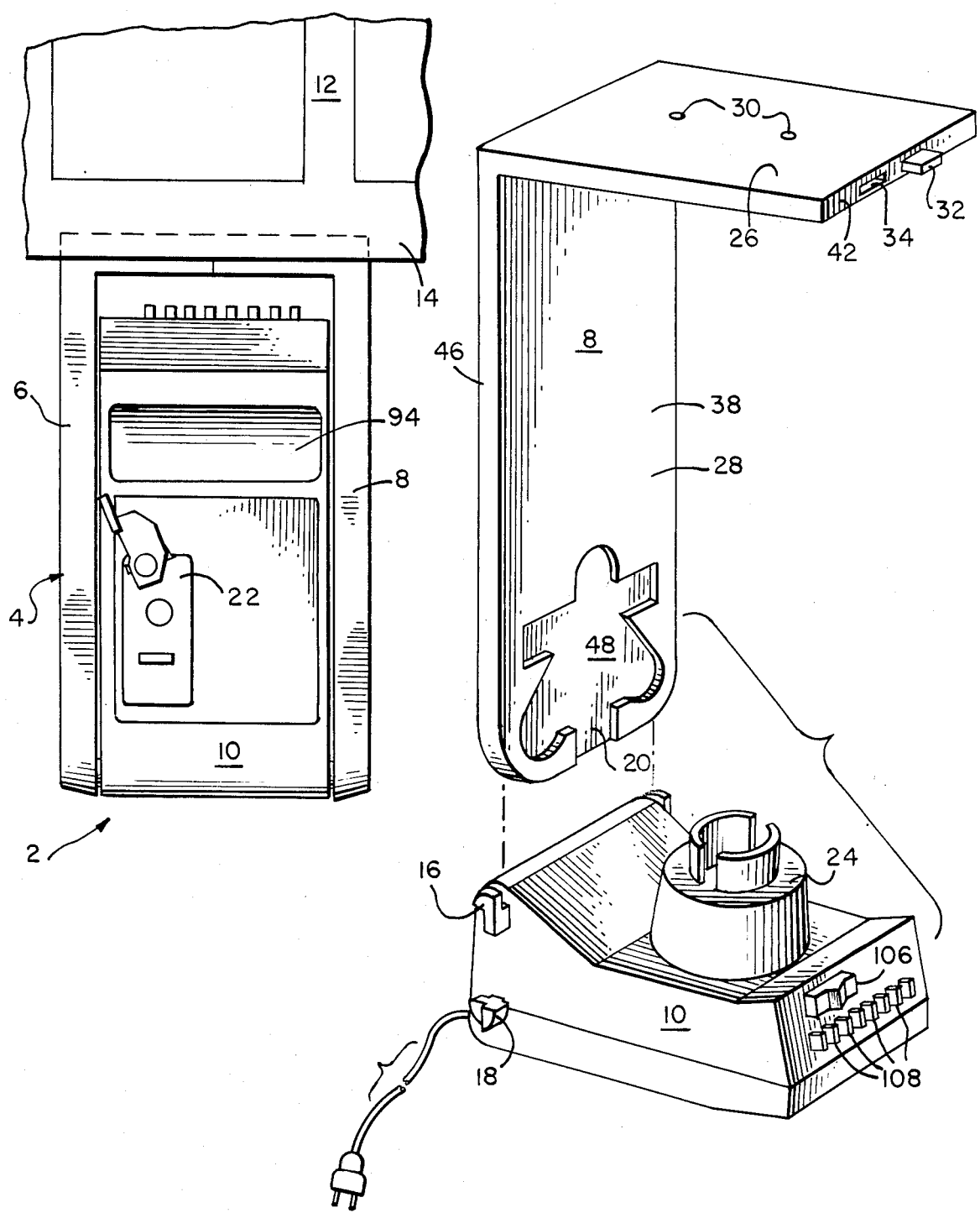

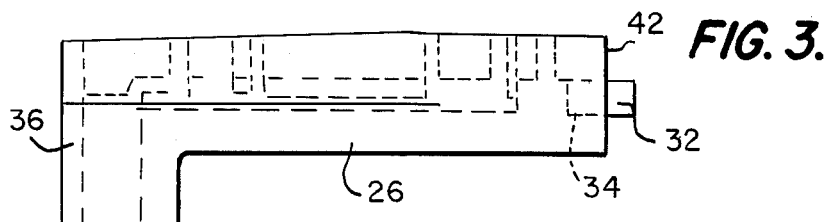
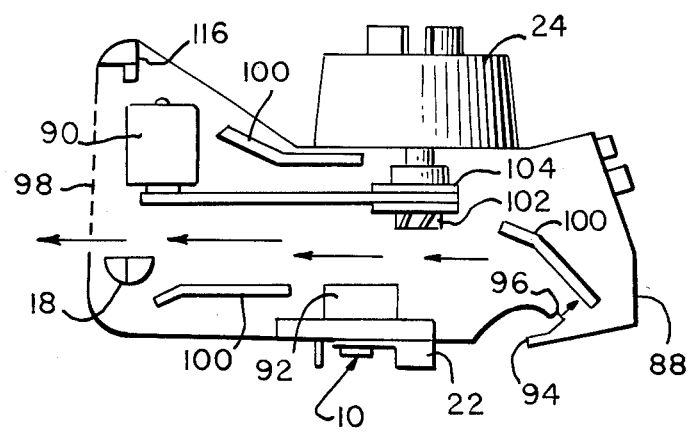
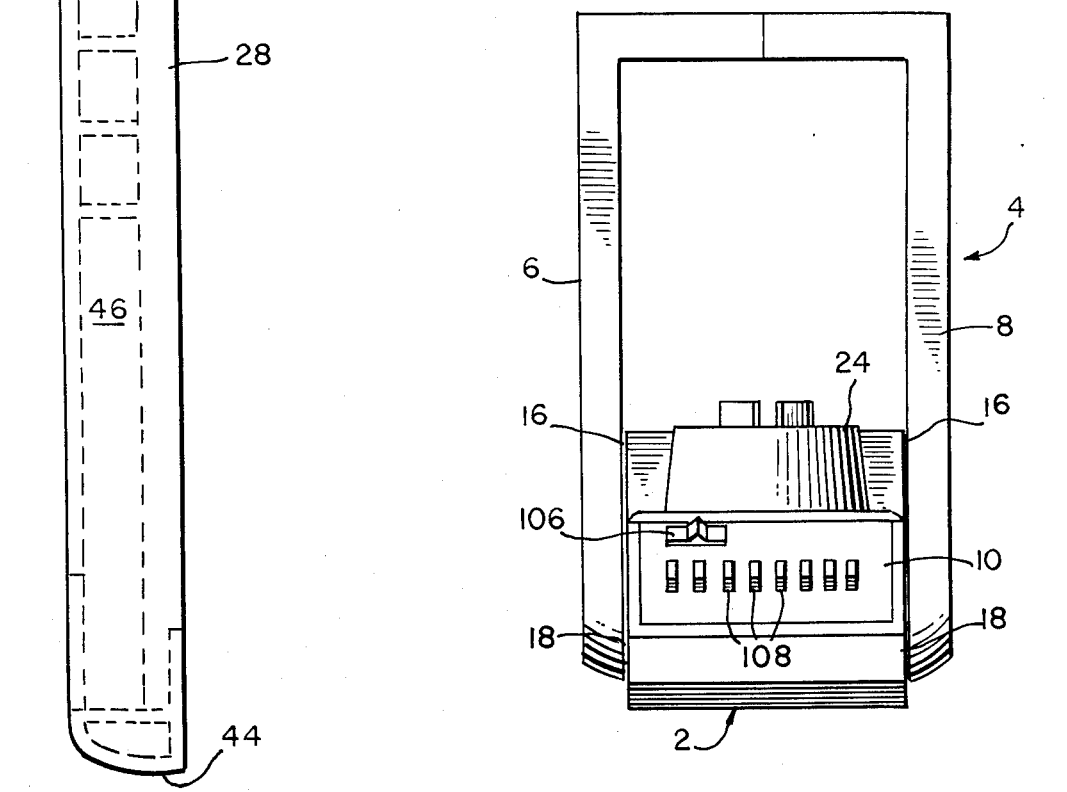

MULTI-PURPOSE KITCHEN APPLIANCE

TECHNICAL FIELD

The present invention relates to kitchen appliances generally, and more particularly to a combined multi-purpose kitchen appliance adapted to be mounted and stored under a kitchen cabinet.

BACKGROUND ART

Recent technological developments have produced a number of new and improved electrically powered kitchen appliances. However, although the variety and number of appliances available is increasing dramatically, the building industry is severly limiting the space, particularly counter and cabinet space, available for kitchen appliances. To alleviate this problem, numerous attempts have been made to design multi-purpose kitchen appliances that will perform as separate single function units. These attempts have followed two principal approaches, both of which have achieved only limited commercial success due to various inadequacies associated with such units.

A first approach involves the production of a single stationary appliance which performs multiple functions through interchangeable attachments driven by a single motor. Such a unit is typified by the U.S. Pat. No. 3,224,743, to Freedman et al which discloses an appliance designed to function primarily as a beater/mixer, but is provided with a socket to which various attachments can be connected for operation by a power take-off shaft. The appliance of this patent also allows for retraction of the beater arm and pivotal rotation of the appliance for disappearing flush storage in a counter top.

As a practical matter, kitchen appliance users do not like interchangeable attachments, both because they require too much time and effort to use and becuase the attachments themselves occupy storage space and may be easily lost or damaged. Moreover, by powering multiple attachments from a single motor through a single drive shaft, the user loses the benefit of all attachments if the single motor malfunctions. In some cases, such as is disclosed in U.S. Pat. No. 4,071,789 to Ernster et al, multi-purpose kitchen appliances are made with a single motor used to drive multiple, variable speed power shafts. A further problem is encountered in this situation since construction and repair of the appliance become unnecessarily complex and costly. Other examples of kitchen appliances in this first category are disclosed in the U.S. Pat. Nos. 4,422,343 to Falkenbach et al and 3,951,351 to Ernster et al.

Manufacturers using a second approach have offered consumers portable kitchen appliances. In U.S. Pat. No. 3,126,627, a portable appliance is disclosed that can be held in the hand while being used for opening cans, beating and whipping, and can be supported while performing other functions, such as sharpening knives. In addition to the possible loss or damage of attachments and the storage requirements associated therewith, somewhat different problems are associated with such portable units. Firstly, the unit itself must be stored somewhere in the kitchen, thereby further aggravating the general space problem which this type of unit was designed, in part, to alleviate. Secondly, in order to make these units portable, lighter and less powerful motors are used which, in turn, make these appliances significantly less capable of satisfactorily performing difficult common tasks, such as kneading dough, than the more powerful fixed units discussed above. Finally, such units frequently offer the consumer functions which are less in demand and less useful than fixed uses, a factor of importance when space is at a premium. For example, the portable units disclosed in the patents to Walter et al (U.S. Pat. No. 3,791,597) and DuBois et al (U.S. Pat. No. 3,821,902) provide, respectively, for an ice crusher and a reciprocating knife, neither of which would normally considered kitchen appliances in high demand.

Other solutions to the organizational and space problems discussed above have been proposed by manufacturers who have offered consumers either separate storage cabinets designed to compactly accommodate a large number of differnt appliances and attachments, as disclosed in the patent to Rogers, Sr. (U.S. Pat. No. 4,334,724), or kitchen appliances which occupy neither counter nor cabinet storage space but are, instead, physically mounted under a cabinet in space which might otherwise normally be wasted. Examples of such appliances are disclosed in the patents to Karlen et al (U.S. Pat. No. 3,232,212) and Smith et al (U.S. Pat. No. 3,002,652). The obvious problem with the former solution is that, although a separate cabinet may be compact and prevent loss or damage to utensils, it still occupies scarce space. Meanwhile, the latter solution, although representing definite progress toward a fundamental resolution of the basic space problem, has, to date, only been used for relatively low power or single function units, primarily because mounting structures have been too unstable to rigidly support heavier mechanisms.

Thus, it has remained an elusive goal of the kitchen appliance industry to provide consumers with a low cost, simple, multipurpose appliance which is sturdy and powerful enough to perform functions requiring heavier duty motors and yet occupies no counter and minimal cabinet storage space.

DISCLOSURE OF THE INVENTION

It is a primary object of the present invention to provide a novel and improved multipurpose kitchen appliance which may be easily mounted and stored beneath a kitchen cabinet and which includes an appliance assembly movable to a plurality of use positions to permit use of one of a plurality of electrical kitchen utensils.

Another object of the present invention is to provide a novel and improved multipurpose kitchen appliance having a mounting bracket with two L-shaped bracket arms which may be easily secured to a mounting surface. Each bracket arm contains an alignment section which cooperates with an alignment section on the remaining bracket arm to permit one arm to be installed in any position and the second arm to be automatically aligned therewith.

A further object of the present invention is to provide a novel and improved multi-purpose kitchen appliance having a mounting bracket consisting of two L-shaped bracket arms, each of which is formed with a symmetrical mounting cavity identical to the mounting cavity in the remaining arm. The mounting cavity in each bracket arm is such that the bracket arms are interchangeable.

Yet another object of the present invention is to provide a novel and improved multi-purpose kitchen appliance which consists of a novel mounting bracket and an appliance assembly which may be easily inserted and removed from the mounting bracket and which is pivotal between two operating positions therein. The appliance assembly may be secured within the mounting bracket without the use of additional hardware or other components, and cooperates with the mounting bracket to lock the lower, spaced extremities of the mounting bracket together to provide a rigid assembly. The mounting bracket operates to positively retain the appliance assembly against either axial or vertical movement in the various operating positions thereof.

A further object of the present invention is to provide a novel and improved multi-purpose kitchen appliance which includes a pivotal appliance assembly including different electrical kitchen utensils on two opposite faces thereof. These kitchen utensils are moved to a use position by pivoting the appliance assembly between different use positions.

Yet another object of the present invention is to provide a novel and improved multi-purpose kitchen appliance having a novel appliance assembly which supports a plurality of different electical kitchen utensils. The different kitchen utensils are driven by separate electrical motors, with the heaviest motor in the unit being positioned adjacent pivot points at one end of the appliance assembly. These pivot points cooperate with pivot mounts at the lower ends of spaced supporting bracket arms for the appliance assembly.

Still another object of the present invention is to provide a novel and improved multi-purpose kitchen appliance having a novel appliance assembly which incorporates separate electrical kitchen utensils on two opposed surfaces thereof. The appliance assembly includes cooling air openings to introduce air to the interior of the assembly and permit the air to flow over the electric motors for the separate kitchen utensils and then out through discharge air openings in the assembly. The air inlet for the assembly may be concealed in a hand hold unit designed to operate as a handle for the assembly.

Yet another object of the present invention is to provide a novel and improved multi-purpose kitchen appliance having an appliance assembly with a plurality of electric kitchen utensils mounted thereon. The appliance assembly includes mounting means to receive removable kitchen utensil modules and cooperates with each removable module to provide operating power to drive the kitchen utensil contained within the module.

A still further object of the present invention is to provide a novel and improved multi-purpose kitchen appliance which incorporates an appliance assembly pivotally mounted within a mounting bracket. The appliance assembly is pivotal within the mounting bracket between a horizontal and a vertical position, and in the vertical position, the appliance assembly is provided with a storage member mounted on one surface thereof to provide storage for separate components used with the kitchen utensils included in the appliance assembly.

These and other objects are accomplished by providing a multi-purpose kitchen appliance consisting of a mounting bracket formed from first and second L-shaped bracket arms and an appliance assembly which is mountable for pivotal movement in the mounting bracket. Each of the L-shaped bracket arms further includes a spacing and alignment unit which cooperates with the spacing and alignment unit on the remaining bracket arm to automatically space and align the two bracket arms in operative position when they are assembled and mounted. Each of the L-shaped bracket arms further includes an inner surface having an appliance mounting cavity formed therein. The appliance mounting cavities in the two L-shaped bracket arms are aligned when the bracket arms are assembled, and are identical in configuration. Each appliance mounting cavity includes a centrally located entrant slot or opening which extends longitudinally inwardly from the lower edge of the associated L-shaped bracket arm. This entrant slot is aligned with a second U-shaped slot of substantially equal width which is spaced longitudinally therefrom inwardly of the bottom edge of the bracket arm. This U-shaped slot is connected to curved slots which extend outwardly on either side thereof and laterally of the longitudinal axis of the L-shaped bracket arm. These outwardly extending slots terminate in a flat end surface.

The appliance mounting cavity is further defined by two spaced side walls which extend downwardly and outwardly from the lower extremity of the laterally extending slots and which terminate inwardly extending, arcuate seats on either side of the entrant slot. This imparts to the appliance mounting cavity a gingerbread man configuration, and opposite halves of the mounting cavity are symmetrical and indentical so that the associated L-shaped bracket arm is operative when oriented in any position.

The appliance assembly for the multi-purpose kitchen appliance is provided with spaced stub projections at one end thereof which cooperate with the appliance mounting cavities in spaced bracket arms for the mounting bracket to support the appliance assembly for pivotal movement between two operative positions. These stub projections are configured to cooperate with mounting ridges and stop ridges formed in the appliance mounting cavity to positively lock the appliance assembly in the use positions thereof against movement in any direction. Also, the appliance assembly operates to rigidly lock the two L-shaped bracket arms of the mounting bracket together to provide an extremely rigid support structure. Separate electric motor driven kitchen utensils are mounted on opposite sides of the appliance assembly so that such utensils are exposed for use when the appliance assembly is pivoted between use positions. The appliance assembly is configured to provide a flow of cooling air for the separate electric motors used to drive different kitchen cooling utensils, and the heaviest electric motor in the unit is positioned adjacent the stub projections which operate as pivots for the unit so as to provide a counter balance in the various use positions of the appliance assembly.

These and other objects of the present invention will become readily apparent from a consideration of the following specification taken in conjunction with the accompanying drawings.

BRIEF DESCRIPTION OF THE DRAWINGS

FIG. 1 is a front elevational view of the multi-purpose kitchen appliance of the present invention shown mounted under a cabinet;

FIG. 2 is an exploded view of the appliance assembly and one L-shaped bracket arm for the multi-purpose kitchen appliance of the present invention;

FIG. 3 is a front elevational view of the L-shaped bracket arm of FIG. 2;

FIG. 5 is a side elevational view of the appliance assembly for the multi-purpose kitchen appliance of the present invention;

FIG. 6 is a front elevational view of the multi-purpose kitchen appliance of FIG. 1 with the appliance assembly horizontally oriented;

BEST MODE FOR CARRYING OUT THE INVENTION

Figure 4:
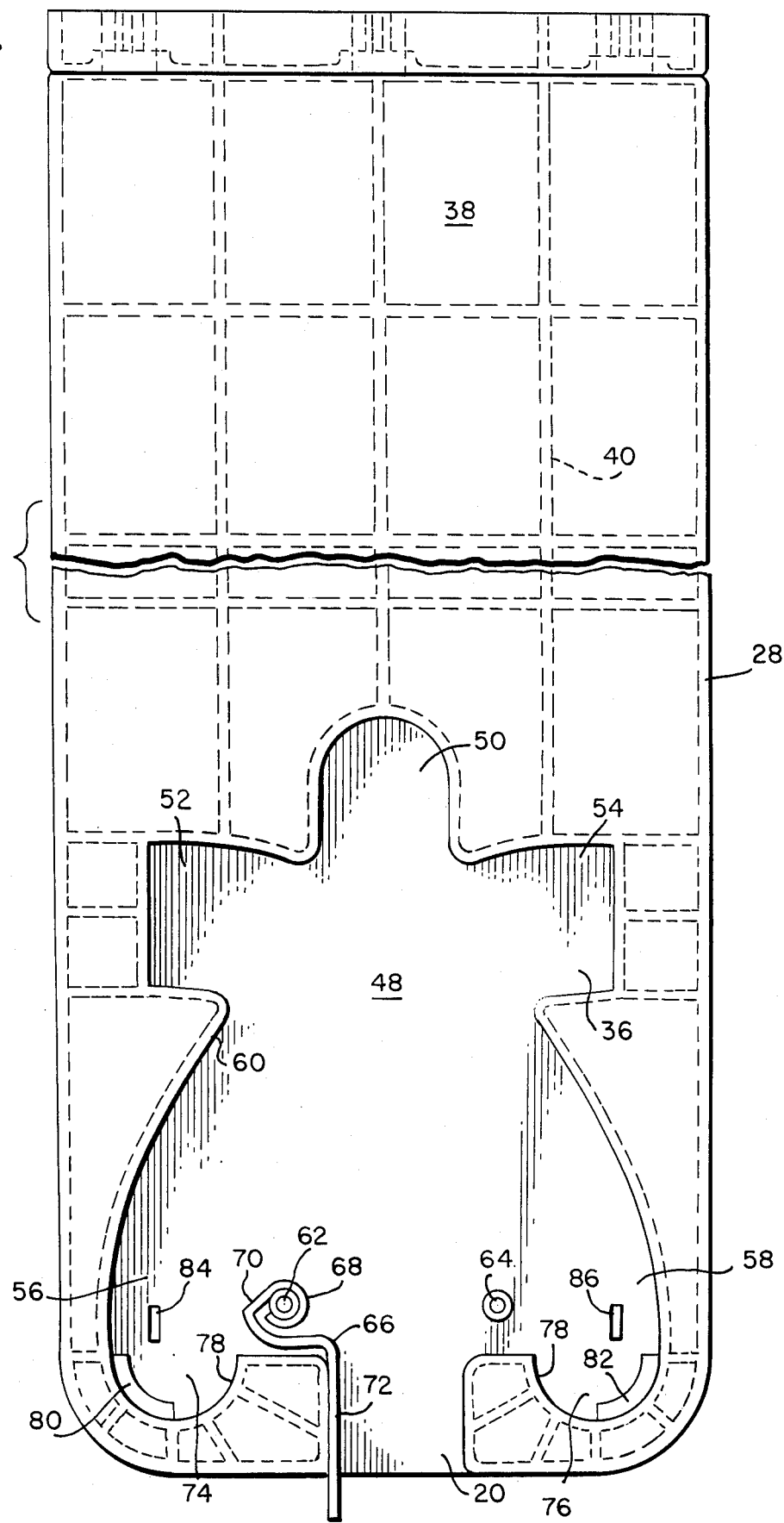
FIG. 4 is a side elevational view of the L-shaped bracket arm of FIG. 2.

For a clear understanding of the subject invention, reference is initially made to FIGS. 1 and 2 in which a multi-purpose kitchen appliance 2, designed and installed in accordance with the subject invention, is illustrated. In particular, this kitchen appliance includes a mounting bracket 4, formed of symmetrical, right and left, L-shaped bracket arms 6 and 8, which support an appliance asembly 10 that incorporates at least two powered electric kitchen utensils. The symmetrical L-shaped mounting bracket arms 6 and 8 are designed to be screw-mounted, in mirror image fashion, under a kitchen cabinet 12 behind a depending cabinet lip 14. Once the mounting bracket is installed, appliance assembly 10 can be inserted by sliding upper and lower stub projections 16 and 18 into respective openings 20 (FIG. 2) in the bottom, of L-shaped arms 6 and 8. Now the appliance assembly can be pivoted in the mounting bracket 4 between a vertical closed position and a lowered position to expose different electric kitchen utensils for use.

In the vertical closed storage position shown in FIG. 1 appliance assembly 10 is vertically positioned within the bracket 4, and in this position, the consumer has the option of either using a kitchen utensil 22, such as a can opener, which is mounted on a first face of appliance assembly 10, or of swinging the appliance assembly into a lowered position for use of another utensil 24 mounted on a second opposed face of the appliance assembly. This swinging is produced by pulling the top of the appliance assembly outward in FIG. 1 so as to cause the assembly 10 to pivot from its vertical closed storage position to a horizontal open position where it will be securely held in place by the upper and lower stub projections 16 and 18.

The unique elements of multipurpose kitchen appliance 2 will be better understood after an explanation of the mechanical structure and various special features of the principal novel components thereof, and of the assembly and interaction of these components.

MOUNTING BRACKETS

Since the mounting bracket 4 is formed from bracket arms 6 and 8, which are substantially identical, interchangeable components, the detailed structure of the bracket arm 8, shown in FIG. 2, and the bracket arm 6, shown in FIG. 3, will be concurrently described.

Each bracket arm is formed in an L-shape with a base leg 26 and a longer hinge leg 28. The base leg of each of the L-shaped bracket arms 6 and 8 contains screw holes 30 to enable mounting of the bracket 4 onto the underside of the kitchen cabinet 12. Also, each base leg includes a projecting tongue 32 and slot 34 at the end thereof (FIG. 2) while the remaining base leg includes a corresponding tongue 32 and slot 34 in the end thereof (FIG. 3) to mate with the slot and tongue respectively of the other base leg. The tongues and slots will interlock, respectively, when the two L-shaped bracket arms 6 and 8 are assembled and mounted, as described below. Other mechanical methods of interlocking and thus aligning the two L-shaped bracket arms, may also be employed.

FIGS. 3 and 4 indicate that each of the L-shaped bracket arms 6 and 8 includes an outer wall 36 spaced from an inner wall 38 by an intervening grid of spacer ribs 40 (shown in broken lines). The inner and outer walls are joined by upper and lower end walls 42 and 44 respectively and sidewalls 46 to provide an enclosed space between the inner and outer walls. Obviously, the bracket arms 6 and 8 could be constructed of solid material with suitable cutouts provided therein for the slot 34 and an appliance mounting cavity 48 to be subsequently described. Also, the inner wall may be omitted, and the spacer ribs 40 will then provide reinforcement for the outer wall.

Hinge leg 28 for both of the L-shaped bracket arms 6 and 8 includes an inner side, shown in FIG. 4, formed with an appliance mounting cavity 48 in the lower end thereof that, to a certain extent, resembles a gingerbread man in shape. The cavity 48 has geometrically related segments similar to a head 50, left and right arms 52 and 54, and left and right legs 56 and 58, which legs are separated by the opening 20 in the bottom edge of the hinge leg 28. It will be noted that a solid rib extends around the cavity 48 to form a cavity outer wall 60. Each segment of the appliance mounting cavity 48 performs a unique function during the assembly, use and disassembly of multipurpose kitchen appliance 2. A detailed description of the unique interrelationship of these segments and elements is presented below under the heading "Assembly".

Projecting pins 62 and 64 are situated in the left and right legs 56 and 58, respectively, of cavity 48 and extend inwardly from outer wall 36. In the preferred embodiment, a gravity latch 66 is mounted for rotation on the pin 62. This latch includes a loop 68 which mounts the latch on the pin and a flat section 70 which serves as a cam guide to lock appliance assembly 10 into place after it is installed in mounting bracket 4. The latch includes a release arm 72 which extends from the flat section 70 through the opening 20 so that the release arm may be moved to release the latch from outside the mounting bracket 4.

Formed at the bottom of each leg 56–68 of the appliance mounting cavity 48 are left and right arcuate seats 74 and 76. These arcuate seats are formed on either side of the opening 20 and each includes a curved surface 78 in the form of a half circle which extends between the outer and inner walls 36 and 38 of the L-shaped bracket arms to form an open top seat. Extending from the inner wall 38 along the inner edge of each arcuate seat 74 and 76 is a curved mounting ridge, with a mounting ridge 80 being formed adjacent to the arcuate seat 74 and a mounting ridge 82 being formed adjacent to the arcuate seat 76. These mounting ridges are positioned along the outermost extent of each arcuate seat, and each mounting ridge extends for approximately one half the arcuate length of the curved surface 78 for the respective arcuate seat.

Also situated in mounting cavity 48 are two rectangular stop ridges 84 and 86, which, like pins 62 and 64, protrude from the outer wall 36 into the mounting cavity 48 for a distance equal to approximately one-half of the depth of the cavity. These stop ridges, as will be subsequently explained, add stability to the multipurpose kitchen appliance 2 when it is used. It will be noted that each stop ridge is positioned slightly above the adjacent mounting ridge 80 or 82 and is positioned between the outer edge of the legs 56 and 58 and the center of a circle along the circumference of which the curved surfaces 78 extend.

FIG. 5 illustrates the arrangement of components within the appliance assembly 10. This appliance assembly includes a casing 88 upon which the can opener 22 and blender 24 are mounted. The blender is driven by a heavy duty electric motor 90 mounted within the casing 88, while the can opener is driven by a separate electric motor 92. To provide cooling for the two motors, an inwardly curved handle portion 94 is formed in the casing to extend substantially across the surface of the casing above the can opener 22. The innermost end of this handle portion is slotted at 96 to provide an air access opening to the interior of the casing 88. Air is now directed by the curved handle portion 94 through the slot 96, between the electric motors 90 and 92, and out through a grill 98 formed in the wall of the casing 88 adjacent the motor 90. This flow of air to cool the motors 90 and 92 may be directed through the casing by suitably positioned fins 100 secured to the casing sidewalls, and the flow of air may be enhanced by rotating blades 102 mounted on rotating elements of the appliance assembly, such as a pulley 104 for the blender which is driven by the motor 90.

The dual function of the handle portion 94 will become apparent from a consideration of FIGS. 1 and 5 which illustrate that the handle is located to permit insertion of the fingers of a user in order to pivot the appliance assembly 10 in the bracket 4. At the same time, the handle operates to direct cooling air through the slot 96 to cool the motors 90 and 92. It should also be noted that the heavier motor 90 is located remote from the handle portion 94 and is positioned adjacent the stub projections 16 and 18. As will be subsequently seen, this placement of the heavier motor operates as a counterweight to aid in the upward pivotal movement of the appliance assembly.

It will be noted that when the appliance assembly 10 is pivoted up into the mounting bracket 4, the can opener 22 is in the use position (FIG. 1). Also, the heavier motor 90 is at the bottom of the unit and tends to hold the unit in the "up" position. Alternatively, when the appliance assembly 10 is pivoted down as shown in FIG. 6, the blender 24 is in the use position with a power switch 106 and control buttons 108 therefor exposed for operation. In the blender operating position of FIG. 6, the weight of the appliance assembly 10 offset the weight of the motor 90 to bias the unit downwardly, since the pivot points for the applicant assembly are the lower stub projections 18 located at the rear of the unit somewhat behind the motor 90.

Figure 7:
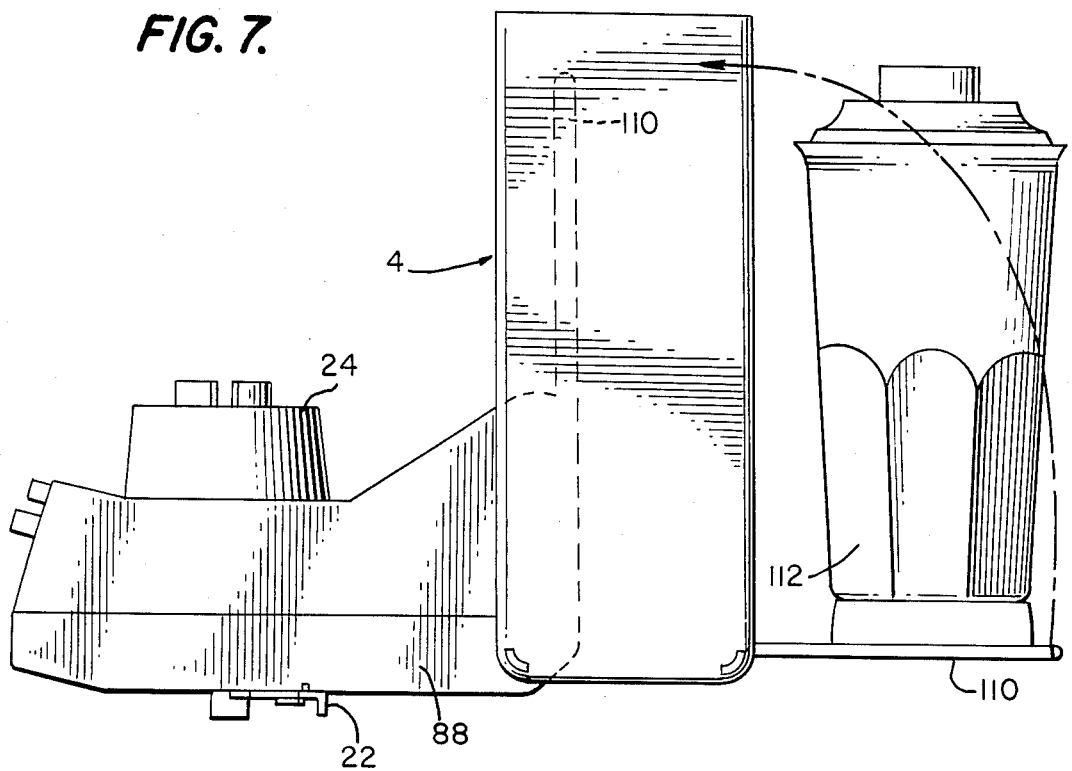
FIG. 7 is a side elevational view of a second embodiment of the appliance assembly for the multi-purpose kitchen appliance of the present invention.

The structure of the appliance assembly 10 may be modified in a number of ways to enable the assembly to provide additional functions. For example, the casing 88 in FIG. 7 includes an integral shelf member 110 which projects upwardly into the space defined by the mounting bracket 4 when the appliance assembly is in the blender operating position. Conversely, when the appliance assembly is pivoted up into the mounting bracket to bring the can opener 22 into the operative position, the shelf member extends outwardly behind the mounting bracket, as shown in solid lines in FIG. 7, to provide a storage shelf for a conventional blender jar 112.

In FIGS. 1, 2, 5, 6 and 7, a can opener 22 is shown mounted on the face of housing 88 opposite that containing the blender 24. These utensils may be replaced by other commonly used electric kitchen utensils, and for example, the blender could be replace by a food processor while the can opener can be replaced by an electric mixer, an ice crusher, a knife sharpener, or any one of a number of other units. Also, more than one electric utensil can be mounted on opposite surfaces of the housing 88.

Figure 8:
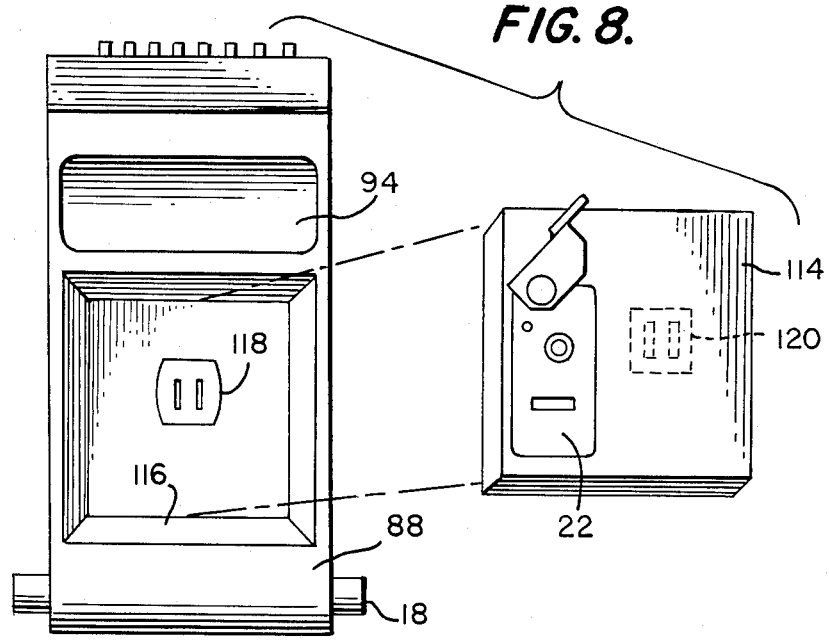
FIG. 8 is an exploded view showing a third embodiment of the appliance assembly for the multi-purpose kitchen appliance of the present invention.

The multipurpose kitchen appliance of the present invention is particulary well adapted to accommodate modular electric utensils as illustrated in FIG. 8. Here, the can opener 22 is incorporated in a removable module 114 which snaps into a module receiving recess 116 formed in the casing 88. The module may contain its own drive motor which obtains electrical operating power via socket 118 which cooperates with a module plug 120, or it may be driven by a second motor permanently housed within the housing 88 via a mechanical power take-off.

This modular concept is important for several reasons. First, since the blender 24, which will be designated as the primary kitchen utensil, and the can opener 22, which will be designated as the secondary kitchen utensil, are driven by separate motors, if one unit malfunctions, the other unit can be maintained in use pending completion of repair. Second, the modular concept allows repair of a malfunctioning secondary kitchen utensil through total disposal and replacement of the module. This approach is both convenient and efficient for the user, since it eliminates either the need to search in stores for small parts and the time associated with their installation, or the need to obtain professional servicing of the electric utensil. Third, a removable module makes cleaning of the respective utensil much easier, and faster than would otherwise be the case. Finally, the use of modules combines the above advantages with the additional possibility of providing the user with multiple different, interchangeable modules and thus further optimizing the use of counter and storage space.

In the alternative embodiments of appliance assembly 10, additional module receiving recesses, similar to the recess 116, may be provided on either or both of the inside and outside faces of the casing 88, which would increase even further the space-saving utility of multipurpose kitchen appliance 2.

ASSEMBLY

In order to better understand additional unique aspects of this invention, it is necessary to study the novel manner in which the mounting brackets 4 and 6 and the appliance assembly 10 interrelate as they are assembled and used by the consumer. As will become evident, assembly is quite simple from the user's viewpoint and results in an extremely stable, rigid multipurpose kitchen appliance 2, without any tools or fasteners being required to establish the hinged interconnection between mounting bracket 4 and appliance assembly 10.

To mount the mounting bracket 4 under a cabinet as shown in FIG. 1, one of the L-shaped bracket arms 6 or 8 is selected and attached to the underside of the cabinet by mounting screws extending through the holes 30. Then the remaining L-shaped bracket arm is aligned by joining the tongues 32 and slots 34 of the opposing bracket arms, and the second bracket arm is then secured to the cabinet. The tongues 32 and slots 34 of the L-shaped bracket arms enable proper final installation of the mounting bracket 4 without the need of a template for locating and aligning the bracket arms. Since the bracket arms are otherwise identical, either bracket arm may be initially selected and secured beneath the cabinet 12 in any desired orientation, and the remaining bracket arm will then be properly positioned by the tongue and slot arrangement.

Figure 9:
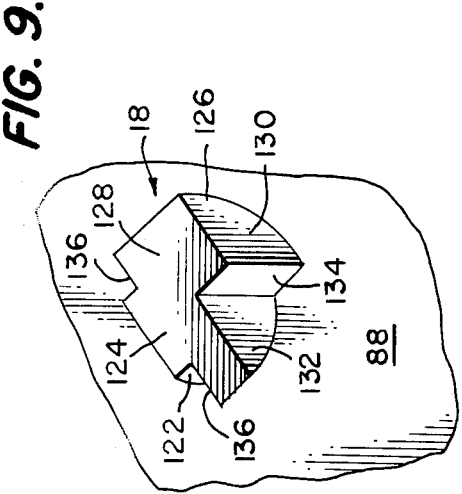
FIG. 9 is a perspective view of a lower stub projection for the appliance assembly of FIG. 5.

Once the mounting bracket 4 is in place, the appliance assembly 10 may be inserted into the mounting bracket and pivotally retained thereby without the use of tools, hinges, or an additional hardware. In order to best understand the manner in which the appliance assembly is installed and retained, a closer examination of the structural details of the upper stub projections 16 and lower stub projections 18 is required. As illustrated in FIGS. 5 and 6, the upper stub projections 16 extend in aligned, opposed relationship from opposite sides at the upper, rear portion of the casing 88, while the lower stub projections 18 are spaced below the upper stud projections and extend in opposed, aligned relationship from opposite sides of the casing. As will be noted from FIG. 9, the lower stub projections, which constitute the pivots for the appliance assembly, include a short neck portion 122 which is secured to the casing 88 and projects outwardly therefrom and which is in the form of a half cylinder having a flat upper surface section 124. Formed integrally with the neck section 122 and spaced outwardly thereby from the casing is a half cylindrical section of larger diameter indicated at 126 having a flat upper surface 128 which is coextensive with the surface 124. The arcuate outer surface of the half cylindrical section 126 conforms substantially to the arc of the curved surfaces 78 for the arcuate seats 74 and 76 (FIG. 4). At the end of the half cylindrical section 126, one side of the section is cut away along the longitudinal center line from the section. This causes the half cylindrical section to be provided with a first flat quarter circular end wall 130 and a second quarter circular end wall 132 which is recessed from the first end wall by the width of a flat sidewall 134. The sidewall 134 is dimensioned to permit the second end wall 132 to pass over the stop ridges 84 and 86 in a manner to be subsequently described. Also, the length and circumference of the neck section 122 is dimensioned to create a slot 136 between the casing 88 and the half cylindrical section 126 of sufficient depth and width to receive the mounting ridges 80 and 82.

Figure 10:
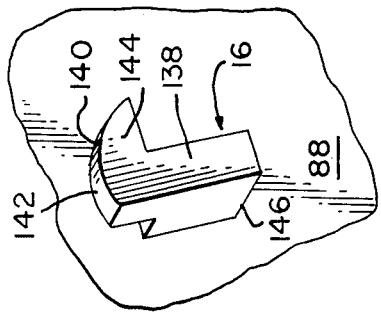
FIG. 10 is a perspective view of an upper stub projection for the appliance assembly of FIG. 5.

The upper stub projection 16 shown, in FIG. 10, constitutes a stop for the appliance assembly and includes a straight stem portion 138 which, with a quarter circular head portion 140, is secured to the casing 88. The quarter circular head portion 140 includes an arcuate wall 142 which conforms to the arc of the curved surface 78 for the arcuate seats 74 and 76, and the quarter circular head portion is substantially equal in size and area to one half of the area of the arcuate seats 74 and 76. The quarter circular head portion includes a flat surface 144 which is connected to the straight stem portion 138 and is spaced from the casing 88 for a distance sufficient to permit the flat surface 144 to pass over the stop ridges 84 and 86. Also, a slot 146 is provided between the head portion 140 and the casing 88 to receive the mounting ridges 80 and 82.

Referring now to FIGS. 11-14, the steps necessary to install and operate the appliance assembly 10 in the mounting bracket 4 are illustrated. Although only one L-shaped bracket arm and set of upper and lower stub projections is shown in FIGS. 11-14, it will be recognized that the identical action is taking place between the remaining set of upper and lower stub projections and the opposed L-shaped bracket arm. Also, when considering the diagrams of FIGS. 11-14, it must be recognized that the views shown are equivalent to viewing the action of the upper and lower stub projections from inside the casing 88, and that the surfaces 130, 132, and 144 in FIGS. 9 and 10 respectively are positioned downward into the paper when viewing FIGS. 11-14.

Figure 11:
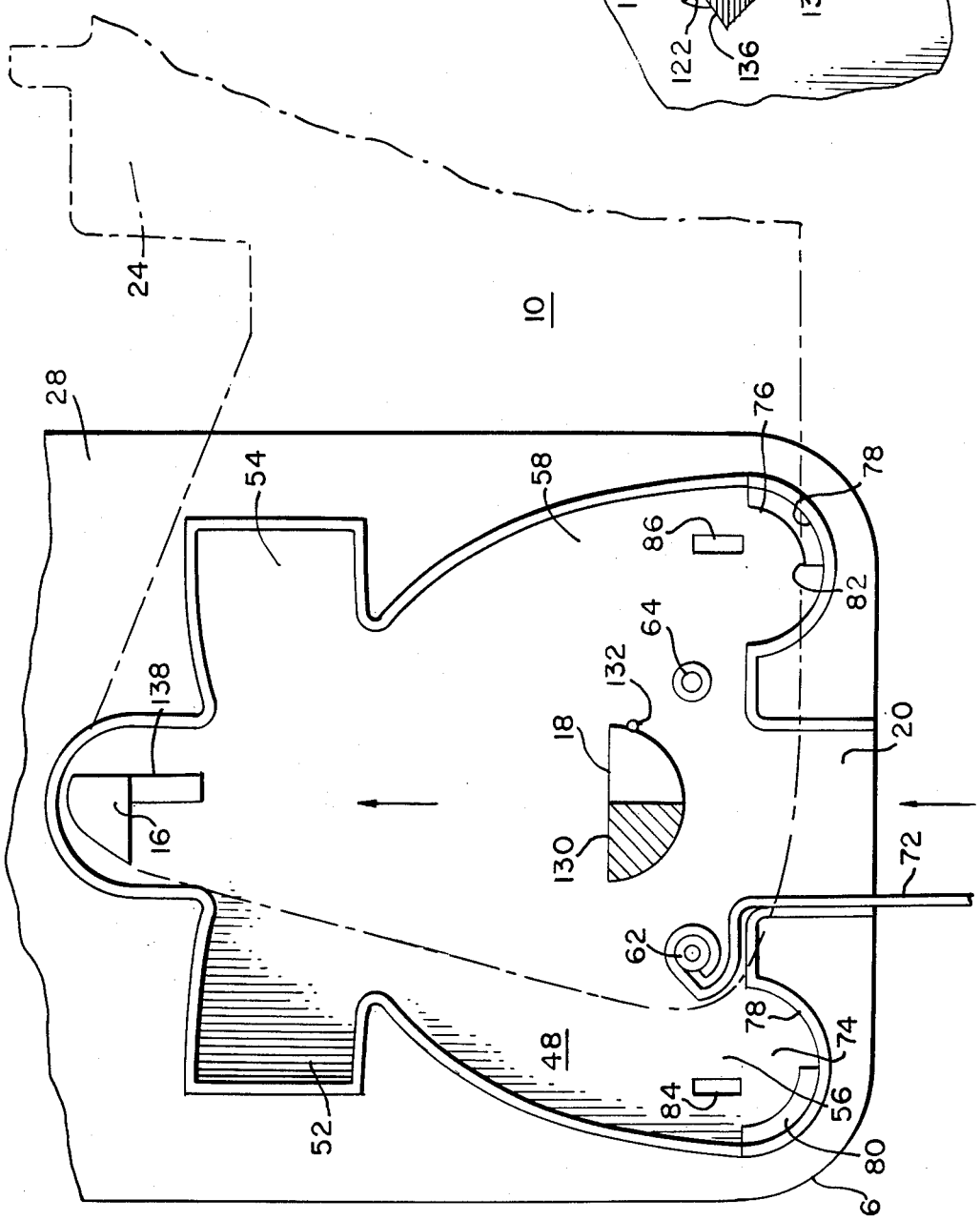
FIGS. 11–14 are diagrammatic illustrations showing the cooperation between the appliance assembly and the mounting bracket for the multipurpose kitchen appliance of the present invention during assembly, disassembly and positioning of the appliance assembly.

The appliance assembly 10 is inserted into the mounting bracket 4 by holding the appliance in a horizontal position between and beneath the right and left L-shaped bracket arms 6 and 8 with the upper and lower stub projections 16 and 18 aligned with the openings 20 in the L-shaped bracket arms. Then the upper and lower stub projections are moved up through the openings 20 and into the appliance mounting cavities 48 until the upper stub projection 16 is in the head portion 50 of the cavity as illustrated in FIG. 11. In FIGS. 11-14, the projecting end wall 130 of the lower stub projection 18 is cross hatched to indicate the surface which projects beyond the remaining surfaces into the paper as viewed in these figures.

Figure 12:
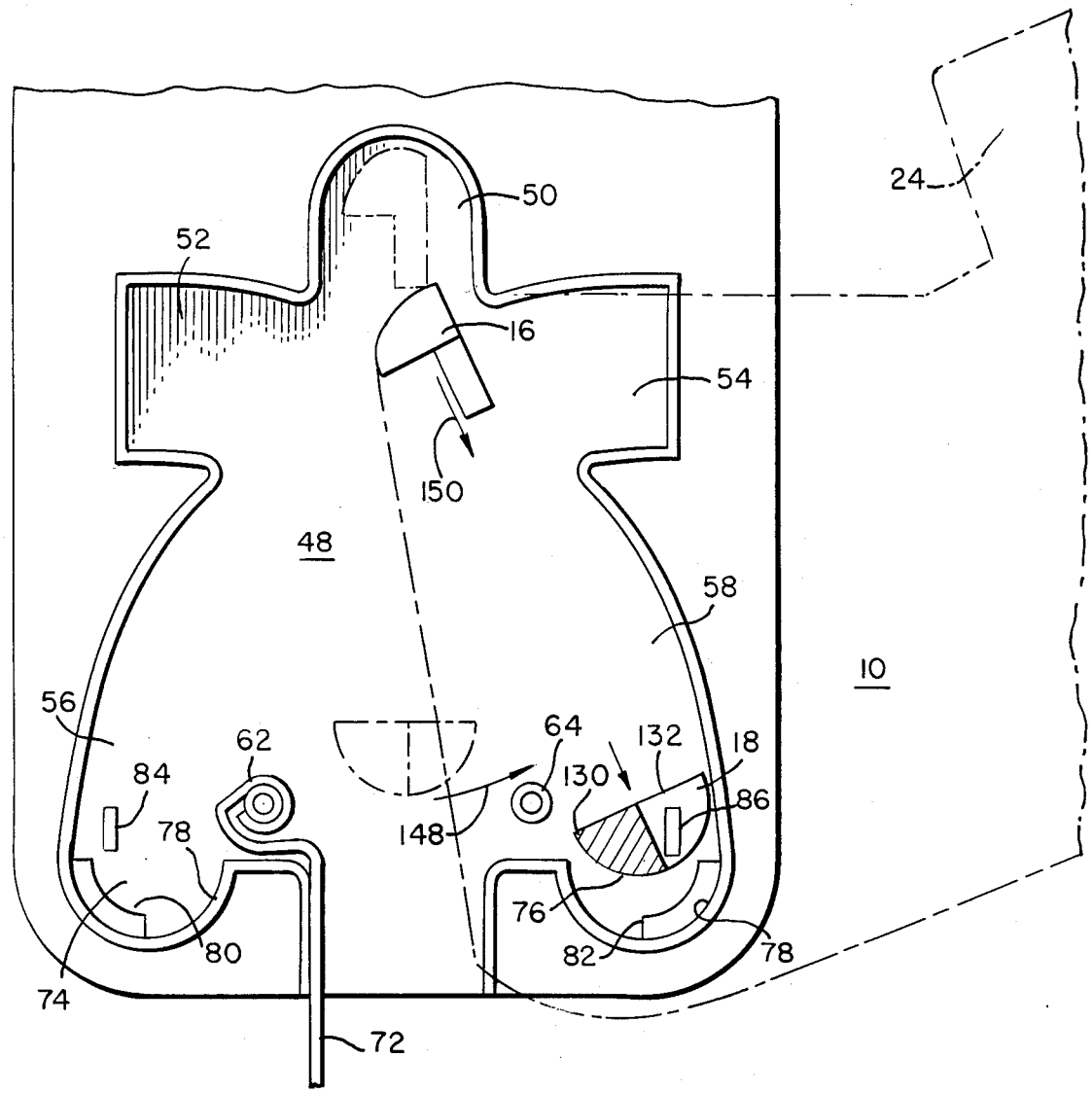

From the position indicated in FIG. 11, the appliance assembly 10 is then tilted upwardly to swing the lower stub projection 18 from the dotted line position over the pin 64 as illustrated by the arrow 148 in FIG. 12. This positions the lower stub projection above the arcuate seat 76. Then the upper and lower stub projections 16 and 18 are moved downwardly in the direction of arrows 150. It will be noted that the indented end wall 132 of the lower stub projection 18 passes over the stop ridge 86. As the lower stub projection 18 moves downwardly to this position, the slot 136 therein is aligned to receive the mounting ridge 82.

Figure 13:
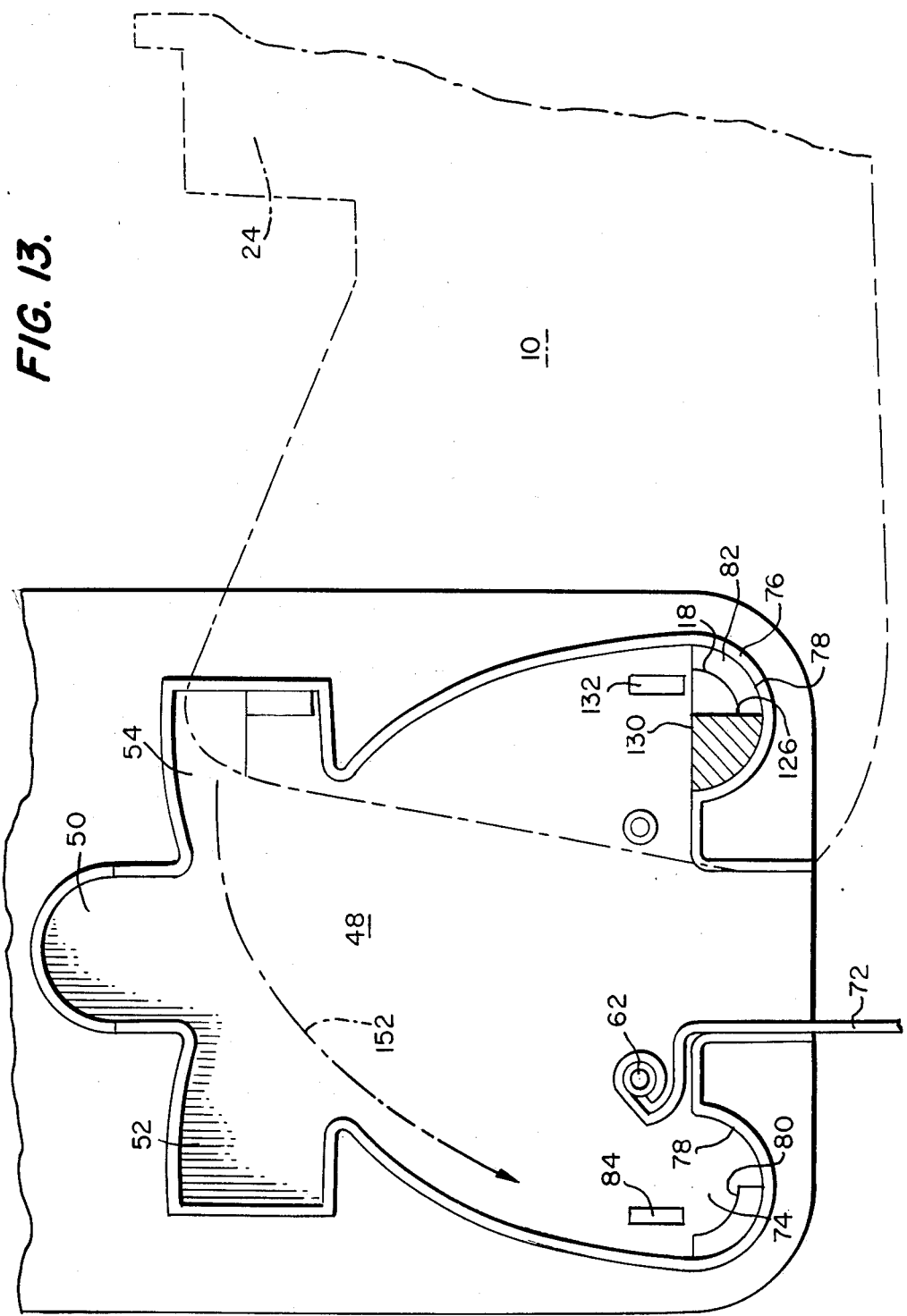
Figure 14:
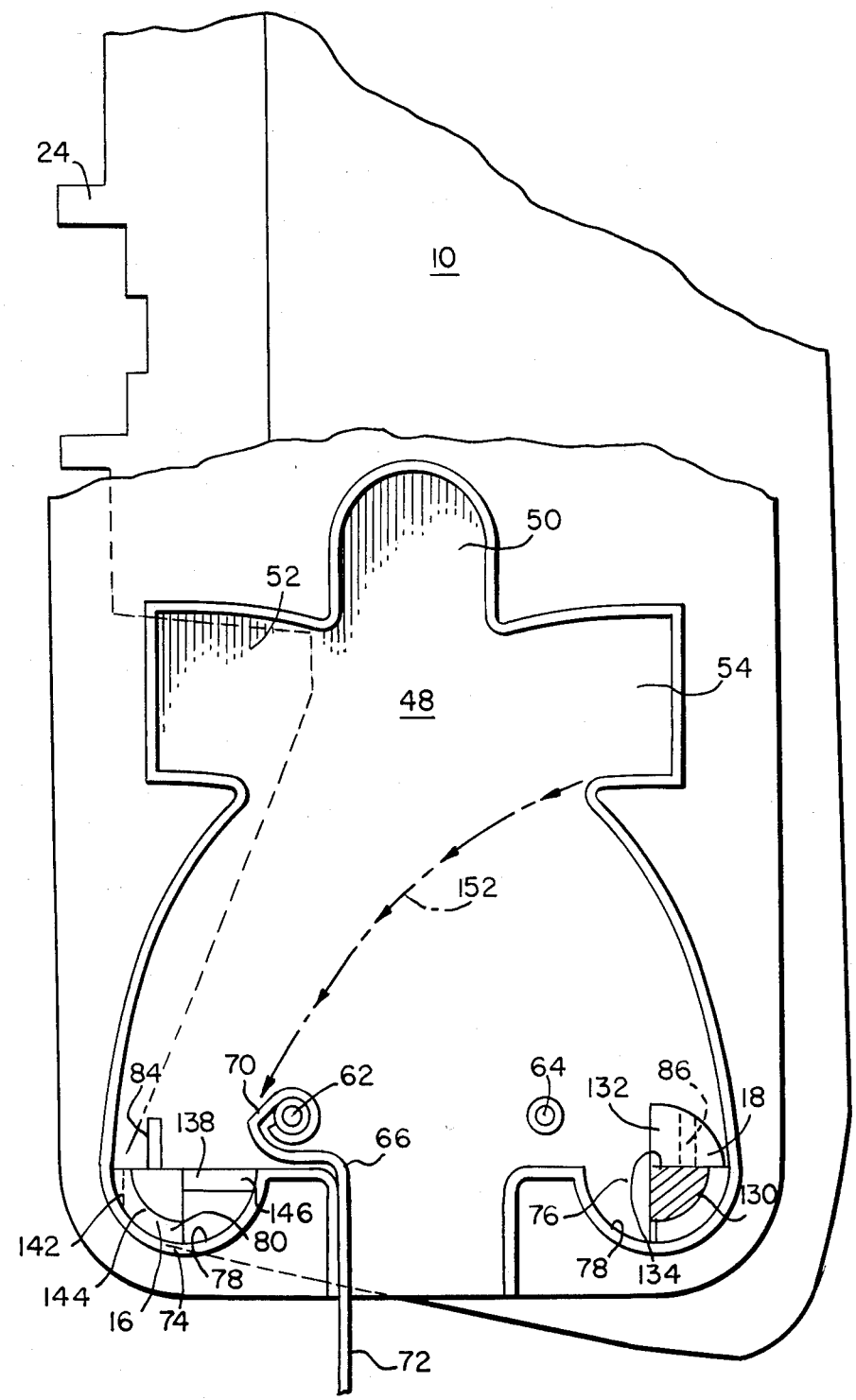

FIG. 13 shows the appliance assembly 10 seated in the horizontal operating position of FIG. 6. Here it will be noted that the upper stub projection 16 is tightly engaged against the end wall of the right arm 54 of the "gingerbread man" appliance mounting cavity 48. At the same time, the outer surface of the half cylindrical section 126 for the lower stub projection 18 is firmly seated on the curved surface 78 of the arcuate seat 76. As indicated, in FIG. 13, the mounting ridge 82 is now firmly seated in the slot 136, and this engagement between the mounting ridge and the slot 136 positively prevents the right and left L-shaped bracket arms 6 and 8 from spreading apart when the appliance assembly 10 is in the horizontal position. This is extremely important, for maximum weight is applied to the mounting bracket 4 with the appliance in the horizontal position of FIGS. 6 and 13, and the stress on the mounting bracket might well cause the right and left L-shaped bracket arms 6 and 8 to move outwardly and present a possibility of releasing the appliance assembly 10. This is positively prevented by the mounting ridges 80 and 82 which extend into the slot 136 between the casing 88 and the enlarged half cylindrical section 126 of the lower stub projection. The lower stub projections positively lock the right and left L-shaped bracket arms 6 and 8 together to form an extremely strong and rigid mounting bracket.

As previously indicated, the kitchen appliance assembly 10 may be pivoted in the mounting bracket 4 from the position shown in FIGS. 6 and 13 to the position shown in FIG. 1. When this occurs, the lower stub projection 18 does not leave the arcuate seat 76, but the upper stub projection 16 moves in the direction of the arrows 152 in FIGS. 13 and 14 from the right arm portion 54 of the recess 48 to the arcuate seat 74. As will be noted from FIG. 14, as the upper stub projection moves downwardly, the lower end of the straight stem portion thereof engages the flat section 70 of the gravity latch 66 causing the latch to pivot about the pin 62 toward the right in the figure. Once the end of the straight stem portion 138 passes by the latch, the latch pivots back into the position shown in FIG. 14 thereby locking the upper stub portion 16 within the arcuate seat 74. The path of travel taken by the upper stub projection causes the falt surface 144 thereof to pass over the stop ridge 84 to permit the arcuate wall 142 to seat against the curved surface 78 of the arcuate seat 74. In this position, the slot 146 receives the mounting ridge 80, and thus the upper stub projection 16 operates to hold the right and left L-shaped bracket arms 6 and 8 together.

As the upper stub projection 16 pivots downwardly to the arcuate seat 74, the lower stub projection 18 pivots in the arcuate seat 76. When the appliance assembly 10 reaches the upright position of FIGS. 1 and 14 and the upper stub projections 16 is in contact with the arcuate seat 74, it will be noted that the flat sidewall 134 of the lower stub projection is in contact with the underside of the stop ridge 86. This contact with the stop ridge prevents the appliance assembly 19 from falling backwardly or to the left in FIG. 14 out of the mounting bracket 4. Thus the stop ridge 86 prevents further pivotal movement of the appliance assembly in one direction while the gravity lock 66 retains the appliance assembly against pivotal movement in the other direction. To pivot the appliance assembly 10 from the vertical position of FIGS. 1 and 14 to the horizontal position of FIGS. 6 and 13, a user merely grasps the curved handle portion 94 and then moves the latch release arm 72 to the right in FIG. 14 to release the gravity latch 66. This permits the appliance assembly to pivot downwardly until the upper stub projection 16 again engages the end wall of the recess arm 54. It will be noted that during the pivotal movement of the appliance assembly, it is impossible for the appliance assembly to be removed from the mounting bracket 4 except during the limited degree of travel when the upper stub projection 16 is positioned beneath the head portion 50 of the cavity. Even then, it is necessary to physically lift the weight of the appliance assembly upwardly to bring the upper stub projection 16 into the head portion of the cavity and to swing the lower stub portion 18 over the pin 64 and into alignment with the opening 20 as illustrated in FIG. 12, before the appliance assembly can be removed. This renders it virtually impossible to inadvertently disengage the appliance assembly 10 from the mounting bracket 4 during movement of the appliance assembly from one appliance operating position to the other.

It is important to recognize that each half of the gingerbread shaped mounting cavity 48 is symmetrical with the remaining half, and that all components of each half are duplicated in the remaining half. This makes it possible to interchange the L-shapd bracket arms 6 and 8 so that a bracket arm may be used as either a left or right bracket arm.

INDUSTRIAL APPLICABILITY

The multipurpose kitchen appliance of the present invention may be easily installed beneath a kitchen cabinet with the use of only a few mounting screws and a screwdriver. Once the mounting bracket 4 is in place, the appliance assembly 10 may be inserted in the mounting bracket without the use of tools or the installation of additional components. When installed, the appliance assembly may be pivoted between two use positions which expose two or more electric kitchen appliances for use. The appliance assembly cooperates with the structure of the mounting bracket in such a manner that the strength of the mounting bracket is enhanced by the presence of the appliance assembly. Also, the appliance assembly is restrained both vertically and axially in all operating positions, and is prevented from being inadvertently removed from the mounting bracket during movement between positions. However, the appliance assembly may easily be removed from the mounting bracket for cleaning and repair.

I claim:

1. A combined multi-purpose kitchen appliance, comprising bracket means for attachment beneath a cabinet; an appliance unit having first and second kitchen appliances thereon, said first and second kitchen appliances being situtated on said appliance unit in a manner causing the first kitchen appliance to be in an operative use position in a first orientation of the appliance unit and the second kitchen appliance to be in an operative use position in a second orientation of the appliance unit; and connection means for interconnecting said bracket means with said appliance unit in manner enabling stable retention of said appliance unit in each of said first and second orientations as well as pivoting of said appliance unit, relative to said bracket means, therebetween.

2. A combined multi-purpose kitchen appliance according to claim 1, wherein the first kitchen appliance is a blender.

3. A combined mutli-purpose kitchen appliance according to claim 2, wherein the second kitchen appliance is a can opener.

4. A combined multi-purpose kitchen appliance according to claim 3, wherein separate motors are provided in the appliance unit for driving the first and second kitchen appliances.

5. A combined multi-purpose kitchen appliance according to claim 4, wherein the can opener is a modular unit with a drive coupling and said appliance unit is provided with a receptacle having a power take-off coupling connected to one of said motors, said modular unit being securable in said receptacle with its drive coupling mated with the power take-off coupling.

6. A combined multi-purpose kitchen appliance according to claim 1, wherein the first kitchen appliance is a primary appliance that is built into said appliance unit and the second kitchen appliance is a secondary appliance that is detachably carried by the appliance unit.

7. A combined multi-purpose kitchen appliance according to claim 6, wherein the secondary appliance is a modular unit with a drive coupling, and said appliance unit is provided with a receptacle having a power take-off coupling connected to a drive motor, said modular unit being securable in said receptacle with its drive coupling mated with the power take-off coupling.

8. A combined multi-purpose kitchen appliance according to claim 7, wherein separate motors are provided for in the appliance unit for driving the primary and secondary appliances.

9. A combined multi-purpose kitchen appliance according to claim 8, wherein the secondary appliance is a can opener.

10. A combined multi-purpose kitchen appliance according to claim 9, wherein the primary appliance is a blender.

11. A combined multi-purpose kitchen appliance according to claim 1, wherein said bracket means comprises a pair of depending bracket arms which are spaced relative to each other for receiving the appliance unit therebetween, and wherein said connection means comprises projecting hinge means on each of opposite sides of the appliance unit and mounting recess means in facing sides of the bracket arms, said hinge means and said recess means being shaped and arranged relative to each other in a manner enabling the hinge means of the appliance unit to be pivotally interlocked with the recess means of the bracket arms.

12. A combined multi-purpose kitchen appliance according to claim 11, wherein said bracket means is formed of a pair of identical L-shaped bracket arms having a base leg for mounting to the underside of a cabinet and hinge leg containing said recess.

13. A combined multi-purpose kitchen appliance according to claim 12, wherein each base arm is provided with coupling means on a free end thereof, the coupling means of the base arms being matingly engageable with each other to form a U-shaped bracket.

14. A combined multi-purpose kitchen appliance according to claim 11, wherein said first orientation is a horizontal orientation in which the appliance unit is substantially perpendicular to said bracket arms, and said second orientation is a vertical orientation in which said appliance unit is nested within a space defined by said bracket arms; and wherein said appliance unit is provided with a stabilizing projection on each of said opposite sides, said stabilizing projections being, respectively, receivable within the recess means of the bracket arms so as to be engageable against respective wall means thereof, at each of said first and second orientations, for stabilizing the orientation of the appliance unit thereat.

15. A combined multi-purpose kitchen appliance according to claim 14, wherein latch means is provided for retaining said appliance in said vertical orientation.

16. A combined multi-purpose kitchen appliance according to claim 15, wherein said latch means is constructed to be automatically engaged when said appliance unit reaches said vertical orientatio and to be manually disengaged for pivoting of the appliance unit into the horizontal orientation.

17. A combined multi-purpose kitchen appliance according to claim 16, wherein said latch means has a cam surface that is actuated by engagement with one of said stabilizing projections.

18. A combined multi-purpose kitchen appliance according to claim 14, wherein the hinge means comprises an at least partially cylindrical hinge member having an arcuately undercut notch, and wherein the mounting recess means has an arcuately curved wall portion with an adjoining flange-like holding wall, said hinge member being receivable against said curved wall portion with said holding wall received within the undercut notch of the hinge member, whereby said bracket arms are precluded from being spread apart so as to cause the hinge means to disengage said recess means.

19. A combined multi-purpose kitchen appliance according to claim 18, wherein said recess means is provided with an opening in a side wall thereof for enabling said hinge members and stabilizing projections to be slid into and out of the recess means of the bracket means for mounting and dismounting of the appliance unit to the bracket means.

20. A combined multi-purpose kitchen appliance according to claim 11, wherein the hinge means comprises an at least partially cylindrical hinge member having an arcuately undercut notch, and wherein the mounting recess means has an arcuately curved wall portion with an adjoining flange-like holding wall, said hinge member being receivable against said curved wall portion with said holding wall received within the undercut notch of the hinge member, whereby said bracket arms are precluded from being spread apart so as to cause the hinge means to disengage from the recess means.

21. A combined multi-purpose kitchen appliance according to claim 20, wherein said recess means is provided with an opening in a side wall thereof for enabling said hinge members to be slid into an out of the recess means of the bracket means for mounting and dismounting of the appliance unit to the bracket means.

22. A combined multi-purpose kitchen appliance according to claim 11, wherein the first kitchen appliance is a blender.

23. A combined multi-purpose kitchen appliance according to claim 22, wherein the second kitchen appliance is a can opener.

* * * * *